United States Patent [19]

Gove

[11] Patent Number: 5,467,138
[45] Date of Patent: Nov. 14, 1995

[54] FIELD TO FRAME VIDEO PIXEL DATA GENERATION

[75] Inventor: Robert J. Gove, Los Gatos, Calif.

[73] Assignee: Texas Instruments Incorporated, Dallas, Tex.

[21] Appl. No.: 412,839

[22] Filed: Mar. 29, 1995

Related U.S. Application Data

[63] Continuation of Ser. No. 183,534, Jan. 18, 1994, abandoned.

[51] Int. Cl.⁶ ........................................... H04N 7/01
[52] U.S. Cl. .................... 348/452; 348/458; 348/459; 348/910; 348/443
[58] Field of Search .................... 348/443, 444, 348/447, 448–453, 458, 459, 700, 910; H04N 7/01

[56] References Cited

U.S. PATENT DOCUMENTS

| | | | |
|---|---|---|---|
| 4,663,665 | 5/1987 | Tanaka et al. | 348/459 |
| 4,791,487 | 12/1988 | Kozuki et al. | 348/700 |
| 4,868,655 | 9/1989 | Choquet et al. | 348/448 |
| 4,984,077 | 1/1991 | Uchida | 348/700 |
| 4,987,489 | 1/1991 | Hurley et al. | 348/459 |
| 5,089,887 | 2/1992 | Robert et al. | 348/699 |
| 5,157,742 | 10/1992 | Niihara | 348/699 |

*Primary Examiner*—Victor R. Kostak
*Attorney, Agent, or Firm*—Julie L. Reed; Richard L. Donaldson; Rene E. Grossman

[57] ABSTRACT

A pixel generator and method of generating pixel data for creating frames of video pixel data from fields of input video pixel data. The pixel processor 16 includes a field buffer circuit 36 that stores a plurality of fields of input video pixel data. Coupled to the field buffer are a feature detector 38 and a pixel generator 40. The feature detector 38 generates one or more feature magnitude signals based upon one or more of the fields of input video pixel data. The pixel generator 40 has at least two logic circuits for generating at least two different intermediate pixel data values based on the input pixel data. Coupled to feature detector 38 is feature analyzer 42 that selects a feature weight corresponding to each intermediate pixel data value, the weight being based upon the value of the feature magnitude signals. Coupled to feature analyzer 42 and pixel generator 40, is a pixel averager 44 that generates output pixel data based upon a weighted average of the intermediate pixel data values.

24 Claims, 4 Drawing Sheets

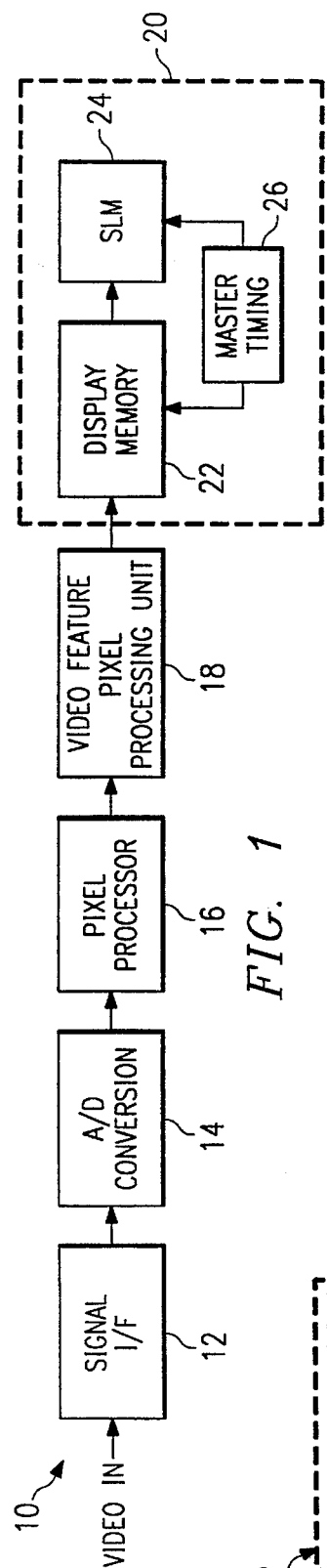
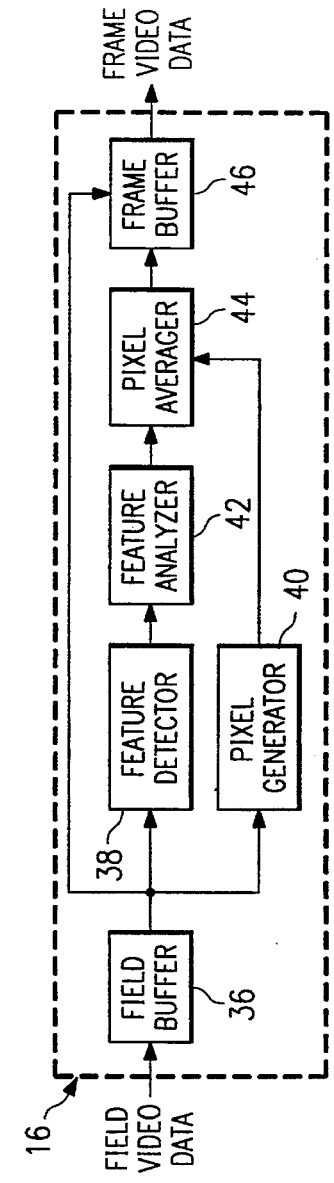
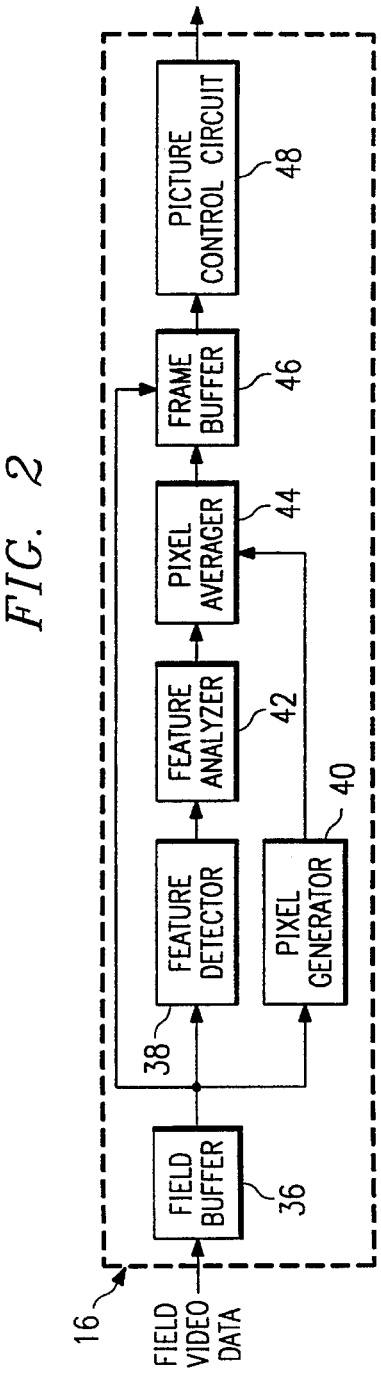
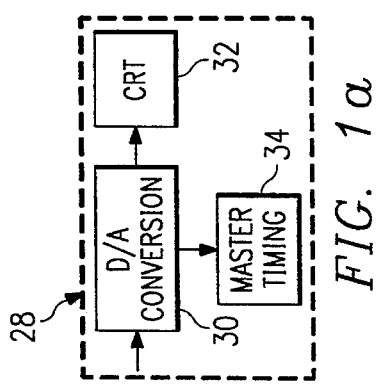

5,467,138

FIELD TO FRAME VIDEO PIXEL DATA GENERATION

This application is a Continuation of application Ser. No. 08/183,534 filed Jan. 18, 1994, which is now abandoned.

TECHNICAL FIELD OF THE INVENTION

This invention relates generally to digital television systems, and more particularly, to a method system and apparatus for producing display frames of pixel data from fields of pixel data.

BACKGROUND OF THE INVENTION

Standard television systems receive and display analog, rather than digital, video signals. A typical standard video signal is referred to as an "interlaced" video signal. In an interlaced video signal, each frame of video data displayed on the standard systems is divided into two fields. The first field may, for example, contain the odd lines of the video frame. The second field may contain the even lines of the same video frame. The two fields making up the single frame are received and displayed successively on the standard system and may appear to a viewer as a single frame. Dividing and displaying a video frame in this manner may decrease the quality of the output of a video system. A standard television displays only thirty frames per second but displays sixty fields per second. This display rate is possible in a standard television system because a cathode ray tube-type display does not instantaneously lose an image after it is displayed. Rather, the display persists for a short period of time, thereby allowing the CRT to provide a constant video image, rather than one with flicker. Commonly used spatial light modulator displays, however, do not have this persistence quality. As a result, sixty complete video frames per second must be displayed to avoid flicker in the video image.

SUMMARY OF THE INVENTION

One aspect of the invention is a method of generating lines of pixel data. These generated lines are added to fields of input pixel data thereby creating display frames of video pixel data from fields of video pixel data. A plurality of fields of video pixel data are stored. From the stored fields of video pixel data, one or more feature magnitude signals are generated and two or more pixel processing methods are applied to generate at least two different intermediate pixel data values. Based upon the feature magnitude signals, feature weights are selected corresponding to each intermediate pixel data value. Output pixel data is then generated based upon a weighted average of the feature weights applied to their corresponding intermediate pixel data values. The output pixel data can then be added to the input pixel data to form frames of video pixel data.

An important technical advantage of the present invention is that it allows the formation and display of frame video data. Displaying a frame video signal produces a sharp and more pleasing video image on the display. Another advantage of the present invention is that the disclosed digital television system can convert a standard interlaced video signal into a non-interlaced video signal. The system is, therefore, capable of receiving currently broadcast television signals and converting them into high resolution digital frame video signals. The present invention also allows modification of the size of a video frame, through vertical scaling of the input video signal.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a block diagram of a digital television system constructed according to the teachings of the present invention;

FIG. 1A illustrates an alternative display module for the digital television system shown in FIG. 1;

FIG. 2 illustrates a block diagram of a pixel generator made in accordance with the teachings of the present invention;

FIG. 3 illustrates an alternative embodiment of a pixel generator made in accordance with the teachings of the present invention;

DETAILED DESCRIPTION OF THE INVENTION

Figure 4:
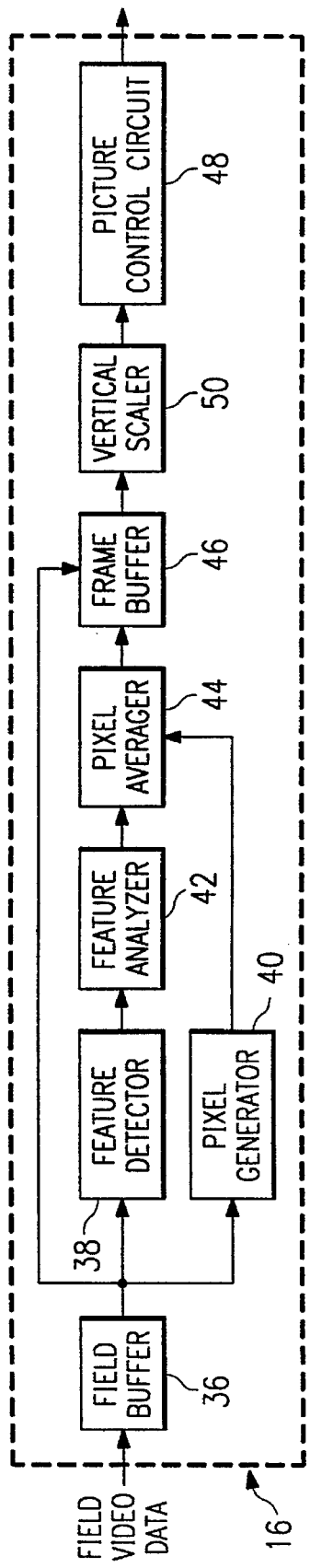
FIG. 4 illustrates an alternative embodiment of a pixel generator made in accordance with the teachings of the present invention.

The preferred embodiment of the present invention and its advantages are best understood by referring to FIGS. 1–14 of the drawings, like numerals being used for like and corresponding parts of the various drawings.

FIG. 1 illustrates a digital display system indicated generally at 10 and constructed according to the teachings of the present invention. Display system 10 allows an input video signal to be used to create a high definition video display.

In system 10, a video signal is received by signal interface

12. Such an interface can be constructed to receive analog composite video signals in the form established by the National Television Standards Committee (hereinafter "NTSC"). Such a signal may then be separated by signal interface 12 into a luminance signal, identified by the symbol Y and two color difference signals, identified by the symbols I and Q. It is understood that system interface 12 may be made operable to receive other types of video signals, standard or non-standard, the former including Phase Alternating Line, Sequential Color with Memory, and Society of Motion Picture Engineers.

After signal interface 12 has separated a video signal into its components, the components are then fed into analog to digital conversion circuit 14. Here, the signals are converted from analog video signals to digital video pixel data signals. The video pixel data signals consist of fields of video pixel data, with a "field" being used herein to refer to a set of pixel data intended to partly or completely fill a display frame. For example, the fields may be the even and odd fields of an interlaced NTSC signal. The structural details of signal interface 12 and analog to digital conversion circuit 14 are not described here. These two stages of system 10 may be constructed, for example, in accordance with the teachings of patent application Ser. No. 08/147249, entitled, "Digital Television System", assigned to Texas Instruments Inc. which is hereby incorporated by reference as if fully set forth herein. Patent application Ser. No. 08/147,249 discloses receiving circuitry which can be used for the signal interface 12 and analog to digital conversion circuit 14 of the presently disclosed digital television system.

After analog to digital conversion circuit 14 converts the analog video signal into fields of video pixel data, these fields of video pixel data feed into pixel processor 16. Pixel processor 16 converts the fields of video pixel data into frames of video pixel data by performing signal processing operations on the input fields of video pixel data. The structure and operation of pixel processor 16 are more fully described below. After pixel processor 16 produces frames of video pixel data, this data feeds into video feature pixel processing unit 18. Video feature pixel processing unit 18 may perform one or more standard video features operations on the frame video pixel data produced by pixel processor 16. Such functions include color space conversion, gamma correction, sharpness, contrast, brightness, hue, and/or saturation. Video feature pixel processing unit 18 could also perform other functions on the frames of video pixel data. Again, a variation on circuitry disclosed in Texas Instruments Application No. 17,855 could be used to form video feature pixel processing unit 18.

From video feature pixel processing unit 18, frame video pixel data feeds into display 20. The display consists of display memory 22 which stores the video frame pixel data received from video feature pixel processing unit 18. The data is then displayed on a Spatial Light Modulator 24 such as a Digital Micro-Mirror Device (herein "DMD") produced by TEXAS INSTRUMENTS INCORPORATED. Spatial Light Modulator 24 connects to display memory 22. Master timing circuit 26 controls the timing of data transfer from the display memory 22 to the Spatial Light Modulator 24.

FIG. 1A illustrates display 28, which is an alternative to display 20. Display 28 consists of digital to analog conversion circuit 30 which converts frame video pixel data into an analog video signal. The analog video signal is displayed on cathode ray tube display 32 which connects to digital to analog conversion circuit 30. The timing for the display and digital to analog conversion is controlled by master timing circuit 34.

In operation, system 10, prepares a video signal to produce an output signal for display. As described previously, system 10 may receive analog or digital video signals. For example herein, the operation of system 10 is described in terms of receiving an analog composite video signal. System 10 separates a composite video signal into its components in signal interface 12. Analog to digital conversion circuit 14 converts these components to field video pixel data signals. Pixel processor 16 then transforms the field video pixel data signals into frame video pixel data signals. Video feature pixel processing unit 18 finely tunes the resulting frame video pixel data signals. Video feature pixel processing unit 18 is optional and need not be included. Alternatively, video feature pixel processing unit 18 could be incorporated into pixel processor 16. Finally, frame video pixel data is sent to display 20 which displays the frame video signals.

FIG. 2 illustrates one embodiment of a pixel processor 16 constructed to the teachings of the present invention. Pixel processor 16 may comprise, for example, field buffer 36, feature detector 38, pixel generator 40, feature analyzer 42, and frame buffer 46.

Field buffer 36 receives field video pixel data and stores a plurality of video fields. In the embodiment illustrated in FIG. 2, the field buffer stores four video fields denoted field $t_0$ through field $t_3$ where $t_0$ denotes the currently received field and $t_1$ through $t_3$ represent the first, second, and third previously received fields respectively. The size of field buffer 36 depends upon the size of each field of the received video signal. An NTSC signal, for example, will require a buffer capable of holding fields of the size 640 by 240 samples of pixel data. Field buffer 36 could be constructed to store more than four fields if more than four fields are required by the feature detector or pixel processor.

The buffered field pixel data feeds into feature detector 38, pixel generator 40, and frame buffer 46. Feature detector 38 accesses fields $t_0$ through $t_3$ to detect various video features present in the video pixel data. For example, as described below feature detector 38 of the disclosed embodiment may detect motion, acceleration, and image edges in the video pixel data. Feature detector 38 produces one or more feature magnitude signals based upon the features detected in the video pixel data. These video feature magnitude signals feed into feature analyzer 42. The structure and operation of feature detector 38 are described in detail below.

Pixel generator 40 also accesses one or more fields of field buffer 36. Pixel generator 40 implements two or more pixel generation methods to produce intermediate pixel data values. The disclosed embodiment of pixel generator 40, for example, performs two pixel generation methods on the buffered field video pixel data, referred to as line doubling and line averaging. The structure and operation of pixel generator 40 are described in more detail below. Pixel generator 40 could be constructed to perform as many pixel generation methods as desired. The intermediate pixel data values produced by pixel generator 40 are used by pixel averager 44 to produce output pixel data.

Feature analyzer 42 receives the feature magnitude signals produced by feature detector 38. Feature analyzer 42 then generates X feature weights, each corresponding to one of the intermediate pixel data values produced by pixel generator 40. X represents the number of intermediate pixel data values produced by pixel generator 40. The disclosed feature analyzer 42 produces one weight for each intermediate pixel data value produced by pixel generator 40. X, then, equals two for the disclosed embodiment. Feature analyzer 42 outputs feature weights to pixel averager 44 for use in generating the output pixel data. The structure and operation of feature analyzer 42 are more fully described below.

Pixel averager 44 generates output pixel data by calculating a weighted average of the intermediate pixel data values using the feature weights as weights. The output pixel data feeds into frame buffer 46, which composes a frame of video pixel data using the output pixel data produced by pixel averager 44 and the input fields of video pixel data stored in field buffer 36. The structure and operation of pixel averager 44 are described more fully below. Frame buffer 46 is optional. The input video field data stored in field buffer 36 and the output pixel data produced by pixel averager 44 could instead feed directly into video feature pixel processor unit 18 or display unit 22, for example.

In operation, pixel processor 16 produces output pixel data for creating frames of video pixel data from fields of video pixel data. Field buffer 36 stores a plurality of input fields of video pixel data. Feature detector 38, pixel generator 40 and frame buffer 46 each have access to field buffer 36. Feature detector 38 generates one or more feature magnitude signals based upon input pixel data stored in field buffer 36. Pixel generator 40 processes the input pixel data with at least two different pixel processing methods to generate at least two different intermediate pixel data values.

Feature analyzer 42 takes the feature magnitude signals generated by feature detector 38 and selects X feature weights where X is the number of intermediate pixel data values produced by pixel generator 40. These feature weights are then supplied to pixel averager 44 which also receives the intermediate pixel data values from pixel generator 40. Pixel averager 44 then generates output pixel data by taking a weighted average of the intermediate pixel data values, applying each feature weight to its corresponding intermediate pixel data value. Pixel averager 44 then supplies the output pixel data to frame buffer 46 which combines the output pixel data with the input pixel data to produce a complete frame of video pixel data.

FIG. 3 illustrates an alternative embodiment of pixel processor 16 constructed in accordance with the teachings of the present invention. The structure of pixel processor 16 illustrated in FIG. 3 is identical to that of the embodiment illustrated in FIG. 2 except that frame buffer 46 is coupled to picture control circuit 48. Picture control circuit 48 is capable of performing one or more picture control functions such as those discussed above for video feature pixel processing unit 18. In the embodiment of pixel processor 16 illustrated in FIG. 3, all of the features performed by video feature pixel processing unit 18 could be incorporated into picture control circuit 48. The output of pixel averager 44 and field buffer 36 could be fed directly into picture control circuit 48.

The operation of pixel processor 16 as illustrated in FIG. 3 is similar to the operation of the embodiment of pixel processor 16 illustrated in FIG. 2, except that the frame video data produced by frame buffer 46 is fed into picture control circuit 48. Picture control circuit 48 then conducts one or more video feature operations on the frame video data to produce tuned frame video pixel data.

FIG. 4 illustrates a third embodiment of pixel processor 16 made in accordance with the teachings of the present invention. In this embodiment, the digital television system 10 is capable of vertically scaling the input video signal. The structure of the embodiment illustrated in FIG. 4 is similar to the structure of the embodiment of pixel processor 16 illustrated in FIG. 2 except that the output of frame buffer 46 is coupled to vertical scaler 50. Vertical scaler 50 couples to picture control circuit 48. In this embodiment of pixel processor 16, picture control circuit 48 is similar to picture control circuit 48 of the embodiment illustrated in FIG. 3. Here however, picture control circuit 48 will normally include circuitry to perform aperture correction. Aperture correction sharpens a vertically scaled image. The vertical scaling performed by vertical scaler 50 may be done in accordance with known methods of vertical scaling such as those described in Texas Instruments Application No. 17855.

The operation of FIG. 4 is, again, similar to that of the pixel processor 16 illustrated in FIG. 2. Here, the output of frame buffer 46 is provided to vertical scaler 50 which scales the frame video pixel data to produce scaled frame video pixel data. The scaled frame video pixel data is provided to picture control circuit 48 which performs one or more operations on the scaled frame video pixel data. The operation of picture control circuit 48 is as described above for FIG. 3 except that picture control circuit 48 will normally be able to perform aperture correction.

The output of pixel averager 44 and field buffer 36 could be coupled directly to vertical scaler 50. In addition, picture control circuit 48 need not be incorporated into pixel processor 16. Instead, the functions performed by picture control circuit 48 could be performed by video feature processing unit 18 of digital television system 10.

Each of the disclosed pixel processors 16 provides many important features and advantages. For example, each pixel processor 16 is capable of generating a frame video pixel data signal. The frame video pixel data signal will provide a sharper and more pleasing video image on the television display. The disclosed invention allows such enhanced images to be displayed without altering currently used television broadcast equipment. The embodiment illustrated in FIG. 4 allows an image to be vertically scaled, thus allowing great flexibility in the type of input video signal used and the dimensions of video display employed.

Figure 5:
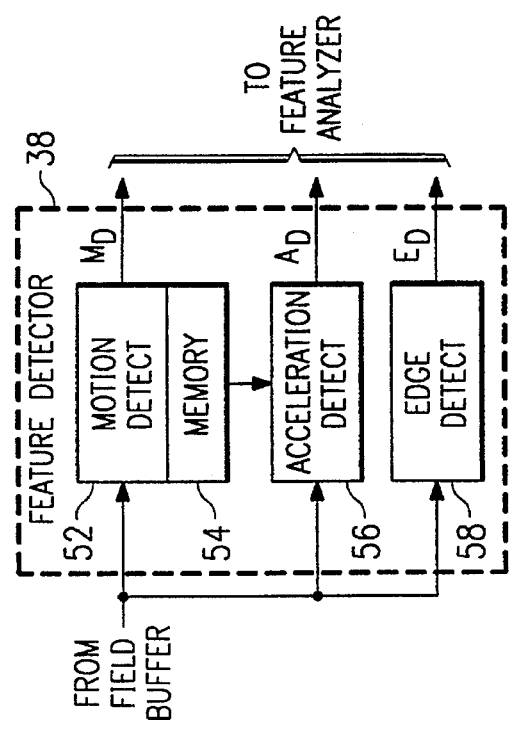
FIG. 5 illustrates an embodiment of the feature detector section of the pixel generator of FIGS. 2, 3, and 4 constructed according to the teachings of the present invention.

FIG. 5 illustrates one embodiment of feature detector 38 of pixel processor 16. Feature detector 38 generates one or more feature magnitude signals based upon various features of the fields of input video pixel data. The embodiment shown in FIG. 5 includes motion detect circuit 52, memory 54, acceleration detect circuit 56, and edge detect circuit 58. The embodiment of feature detector 38 illustrated in FIG. 5 performs three feature detection functions. Specifically, the illustrated feature detector 38 detects motion, acceleration and image edges. Feature detector 38 could easily be constructed to detect more or fewer features without deviating from the teachings of the present invention.

Motion detect circuit 52, acceleration detect circuit 56 and edge detect circuit 58 are each coupled to the output of field buffer 36. The outputs of motion detect circuit 52, acceleration detect circuit 56 and edge detect circuit 58 all feed into to feature analyzer 42. The output of motion detect circuit 52 also feeds into memory 54 for use in acceleration detect circuit 56.

In operation, motion detect circuit 52, acceleration detect circuit 56 and edge detect circuit 58 generate feature magnitude signals based upon the input pixel data and the feature in question. Each feature magnitude signal may be produced simultaneously to each other feature magnitude signal. The operation of motion detect circuit 52, acceleration detect circuit 56 and edge detect circuit 58 are more fully described below. In the disclosed embodiment, each feature magnitude signal represents a 4-bit value.

Figure 8:
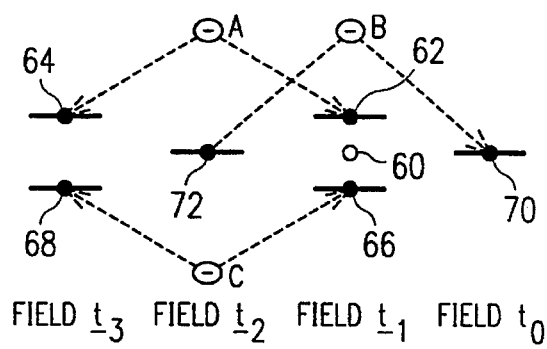
FIG. 8 illustrates the relationship between the pixels used by a motion detection function in accordance with the teachings of the present invention.

FIG. 8 illustrates one example of the relationship between the pixels used by the motion detection function performed in motion detect circuit 52. The output of motion detect circuit 52, $M_d$ for pixel 60 is a weighted average of three differences. The motion detect output, $M_d$ may be calculated according to equation (1):

$$M_d = \left( \left( \frac{1}{4} * |A_{f1} - A_{f3}| \right) + \left( \frac{1}{2} * |C_{f1} - C_{f3}| \right) + \left( \frac{1}{4} * |B_{f0} - B_{f2}| \right) \right)$$

In equation (1) the term $|A_{f1} - A_{f3}|$ is the difference between the value of a first neighboring pixel 62 in a first previous field and the same pixel 64 in a third previous field. Additionally, the term $|C_{f1} - C_{f3}|$ is the difference between a value of a second neighboring pixel 66 in a first previous field and the same pixel 68 in a third previous field. Finally, the term $|B_{f1} - B_{f2}|$ is the difference between the value of pixel 70 in the current field and the value of the same pixel 72 in a second previous field. Motion detect circuit 52 consists of circuitry capable of performing the operations required by equation (1). Simpler or more complex equations for motion detection can be readily imagined using a smaller or larger number of stored video fields.

The results of the motion detect algorithm can be stored in memory 54 for use in performing the acceleration detect function in acceleration detect circuit 56. In the embodiment illustrated in FIG. 5, acceleration detection can be performed simply by subtracting the last previous motion detect signal for a specific pixel from the current motion detect signal for that pixel. A large difference between the two values indicates either high acceleration or noise. A small difference, on the other hand, indicates relatively constant motion.

Figure 9:
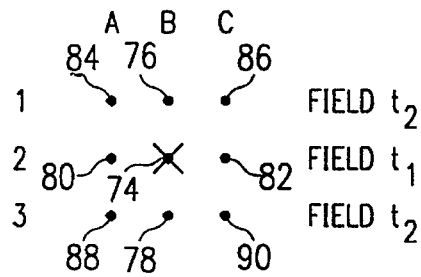
FIG. 9 illustrates the relationship between the pixels used by an edge detection function in accordance with the teachings of the present invention.

FIG. 9 illustrates the pixels used by edge detect circuit 58 to perform image edge detection. The output of the edge detection function for pixel 74 is a weighted average of the difference between pixel 74 and each surrounding pixel. The image edge detection output $E_d$ may be calculated according to equation (2):

$$E_d = \frac{1}{8} * (|B_2 - A_1| + |B_2 - B_1| + |B_2 - C_1| + |B_2 - A_2| + |B_2 - C_2| + |B_2 - A_3| + |B_2 - B_3| + |B_2 - C_3|)$$

In equation (2) the term $|B_2 - B_3|$ is the difference between the value of the pixel 76 directly above pixel 74. All of the pixels in rows 1 and 3 of FIG. 9 are taken from field $T_2$ while the pixels in row 2 of FIG. 9 are taken from field $T_1$. The term $|B_2 - B_3|$ is the difference between the value of pixel 74 and of pixel 78, which lies directly below pixel 74. The term $|B_2 - A_2|$ and $|B_2 - C_2|$ represent the difference between the value of pixel 74 and the value of the neighboring pixels 80 and 82 to the left and right, respectively, of pixel 74. Finally, the terms $|B_2 - A_1|$, $|B_2 - C_1|$, $|B_2 - A_3|$, and $|B_2 - C_3|$ represent the difference between pixel 74 and the diagonally neighboring pixels 84, 86, 88, and 90 to the upper left, upper right, lower left, and lower right, respectively of pixel 74.

Equation 2 may be computed using a Roberts Operator. Where $E_d$ is large, the algorithm indicates a steep image edge. Where $E_d$ is small, the algorithm indicates a gradual image edge or no edge at all. More elaborate edge detection algorithms can be used without departing from the teachings of the present invention.

Figure 6:
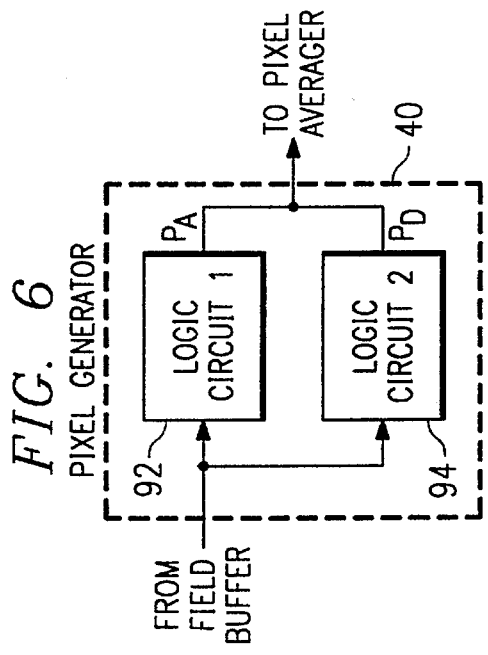
FIG. 6 illustrates an embodiment of a pixel processor section of the pixel generator of FIGS. 2, 3, and 4 constructed according to the teachings of the present invention.

FIG. 6 illustrates an embodiment of pixel generator 40 used in pixel processor 16. The embodiment of pixel generator 40 illustrated in FIG. 6 comprises a first logic circuit 92 and a second logic circuit 94. Alternative embodiments of pixel generator 40 could include additional logic circuits.

Each logic circuit processes the input pixel data stored in field buffer 36 and generates an intermediate pixel data value. Pixel averager 44 receives the intermediate pixel data values produced by pixel generator 40.

In operation, each logic circuit performs a separate pixel generating method on the input pixel data stored in field buffer 36. In the embodiment illustrated in FIG. 6, first logic circuit 92 performs line averaging. Second logic circuit 94 performs line doubling. The symbol $P_a$ represents the intermediate pixel data values produced by first logic circuit 92, denoting that these values were produced by line averaging. The symbol $P_d$ represents the intermediate pixel data values produced by second logic circuit 94, indicating that these values were produced by line doubling. The line doubling and line averaging methods are provided only as examples. More elaborate pixel generating functions can easily be implemented without departing from the teachings of the present invention.

Figure 10:
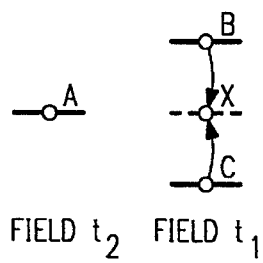
FIG. 10 illustrates a line averaging function in accordance with the teachings of the present invention.

FIG. 10 illustrates the line averaging function according to the teachings of the present invention. The line averaging function determines a value for a pixel X based upon pixels B and C in the adjacent lines of the current field. The value of pixel X is determined according to equation (3):

$$X = \frac{(B + C)}{2}$$

Figure 11:
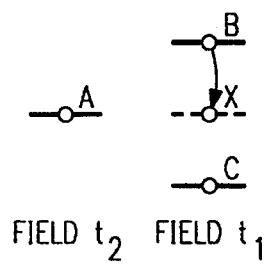
FIG. 11 illustrates a line doubling function in accordance with the teachings of the present invention.

FIG. 11 illustrates the line doubling function according to the teachings of the present invention. The line doubling function equates the value of pixel X with the value of pixel B according to equation (4):

X=B

Accordingly, each pixel generator performed by the logic circuits in pixel generator 40 produces an estimate for a video field. These estimated video fields may then be used by pixel averager 44 to produce field pixel data which can be combined with input field video pixel data to compose output frame video pixel data.

Figure 7:
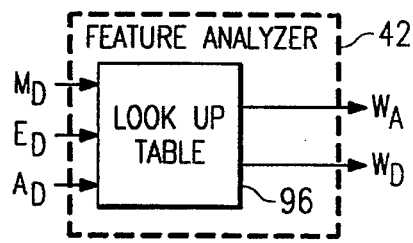
FIG. 7 illustrates an embodiment of the feature analyzer section of the pixel generator of FIGS. 2, 3, and 4 constructed according to the teachings of the present invention.

FIG. 7 illustrates an embodiment of feature analyzer 42 constructed in accordance with the teachings of the present invention. Feature analyzer 42 comprises lookup table 96. Lookup table 96 is X dimensional, where X corresponds to the number of feature magnitude signals produced by feature detector 38. In the embodiment illustrated in FIG. 7, the lookup table 96 is three dimensional as feature detector 38 produces three feature magnitude signals, $M_d$, $E_d$, and $A_d$.

Lookup table 96 produces a weight corresponding to each output of pixel generator 40. In the embodiment illustrated in FIG. 7, lookup table 96 produces weights $W_a$ and $W_d$ as pixel generator 40 produces two intermediate pixel data values.

In operation, the values of the feature magnitude signals are applied to the input of lookup table 96. The lookup table 96 then provides the feature weights corresponding to the input feature magnitude signals as outputs. These outputs are provided to pixel averager 44.

The appropriate weights may be computed in a countless number of ways. The discussion below describes how to generate a one dimensional lookup table for each feature performed by feature detector 38 of FIG. 5. It is understood that one skilled in the art could produce a three dimensional lookup table by combining the one dimensional lookup tables described below.

Figure 12:
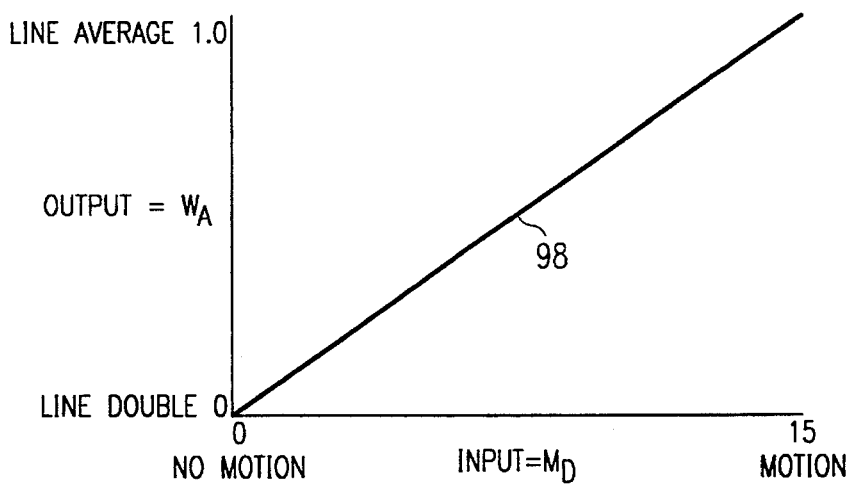
FIG. 12 illustrates a feature weight generating function for motion in accordance with the teachings of the present invention.

FIG. 12 illustrates a graph from which a lookup table can be computed based upon the motion detect feature magnitude signal. In the embodiment illustrated in FIG. 5, the motion detect signal $M_d$ is a 4-bit value. A value of 0 thus indicates no motion while a value of 15 indicates much motion. Using $M_d$ as an input, the output weight $W_a$ can be read from motion curve 98. The output weight Wa, has a value of between zero and one. The second weight produced by feature analyzer 42, $W_d$ can be computed by subtracting $W_a$ from one. In this way, the sum of the feature weights adds up to one. As the graph in FIG. 12 illustrates, the greater the amount of motion detected, the greater the value of the weight corresponding to the line average intermediate pixel data. When less motion is detected, greater weight should be attributed to the line doubling intermediate pixel data value.

Figure 13:
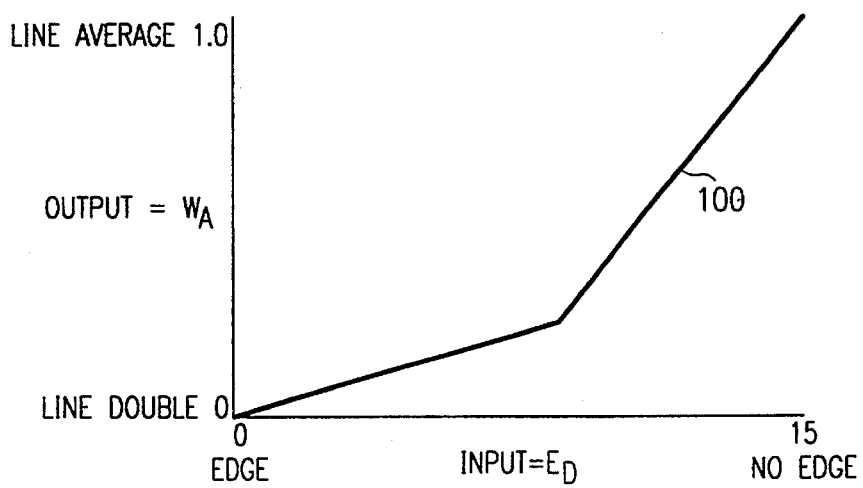
FIG. 13 illustrates a feature weight generating function for image edges in accordance with the teachings of the present invention.

FIG. 13 illustrates a graph similar to that illustrated in FIG. 12. FIG. 13, however, provides a graph that can be used to generate feature weight $W_a$ based upon feature magnitude signal $E_d$. $E_d$ is a feature magnitude signal that indicates the degree to which a pixel is on the edge of a video image. The output weight $W_a$ is computed by reading a value of edge curve 100 based upon the input $E_d$. The feature weight $W_d$ can be computed, once again, by subtracting $W_a$ from one. Again, the feature weights add up to one. As the graph in FIG. 13 illustrates, where the feature weight signal $E_d$ indicates a sharp edge, the feature weight is greater for the line doubled intermediate pixel data value. When little or no edge is detected, the feature weight is greater for the line average intermediate pixel data value.

Figure 14:
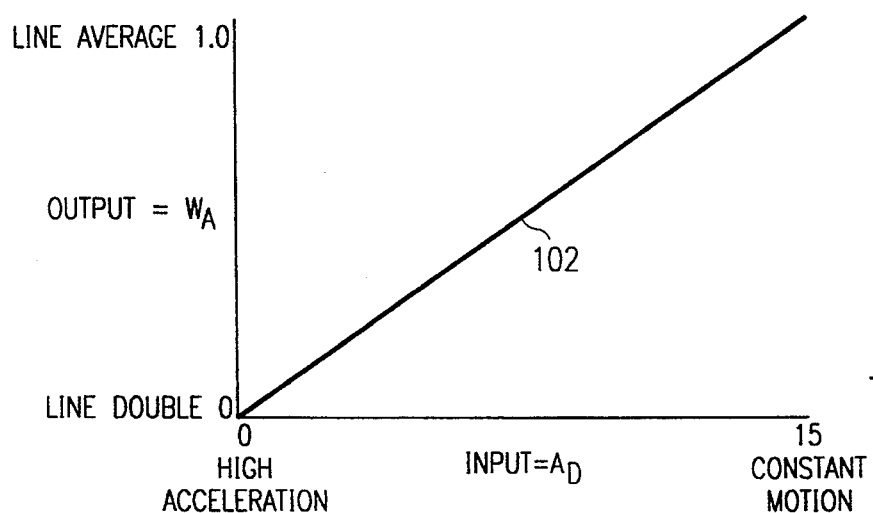
FIG. 14 illustrates a feature weight generating function for acceleration in accordance with the teachings of the present invention.

FIG. 14 illustrates a graph which can be used to generate the feature weight $W_a$ based upon the magnitude of the acceleration detect feature magnitude signal, $A_d$. $W_a$ is produced as described above for FIGS. 12 and 13 except that acceleration curve 102 is used to produce the output $W_a$. $W_d$ may then be produced by subtracting $W_a$ from one, as above. The value of $W_a$ may be read from acceleration curve 102 based upon input $A_d$. As FIG. 14 illustrates, when motion is relatively constant, the resulting feature weight corresponding to the line averaging intermediate pixel data value is larger. Where there is a high degree of acceleration, the resulting feature weight corresponding to the line doubling intermediate pixel data value is larger.

Figure 7A:
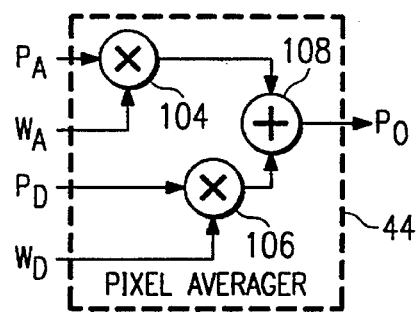
FIG. 7A illustrates an embodiment of the pixel averager section of the pixel generator of FIGS. 2, 3, and 4 constructed according to the teachings of the present invention.

FIG. 7A illustrates pixel averager 44 made in accordance with the teachings of the present invention. Pixel averager 44 generates output pixel data based upon a weighted average of the intermediate pixel data values computed by applying the corresponding feature weights to each intermediate pixel data value. In the embodiment illustrated in FIG. 7A, pixel averager 44 is comprised of first multiplier 104, second multiplier 106, and adder 108.

First multiplier 104 multiplies future weight $W_a$ by intermediate pixel data value, $P_a$ where $P_a$ was produced by pixel generator 40 using the line averaging interpolation function. Second multiplier 106 multiplies feature weight $W_d$ by intermediate pixel data value $P_d$, where $P_d$ was produced by pixel generator 40 using the line doubling interpolation function. Adder 108 adds the results produced by first multiplier 104 and second multiplier 106. Adder 108 thus produces output pixel data, $P_o$ which is then fed to frame buffer 46 in pixel processor 16. Pixel averager 44 will normally have N multipliers where N is the number of intermediate pixel data values produced by pixel generator 40. In the embodiment illustrated in FIG. 7A pixel averager 44 has two multipliers because pixel generator 40 generates two intermediate pixel data values.

Although the present invention and its advantages have been described in detail, it should be understood that various changes, substitutions and alterations can be made therein without departing from the spirit and scope of the invention as defined by the appended claims.

What is claimed is:

1. A method of generating pixel data for creating frames of video pixel data from fields of input video pixel data, comprising the steps of:

storing a plurality of the fields of input video pixel data;

generating one or more feature magnitude signals from on or more of the field of input video pixel data, wherein one of said feature magnitude signals measures acceleration;

processing the input video pixel data with at least two different pixel processing methods to generate at least two different intermediate pixel data values;

selecting a feature weight corresponding to each intermediate pixel data value, wherein the selection is based upon the value of said one or more feature magnitude signals; and generating output pixel data based upon a weighted average of the intermediate pixel data values wherein the weights consist of the feature weights corresponding to each intermediate pixel data value.

2. The method of claim 1 and further comprising the step of combining the output pixel data with the fields of input video pixel data to produce frames of video pixel data.

3. The method of claim 1 wherein said step of generating one or more feature magnitude signals is performed by measuring motion.

4. The method of claim 1 wherein said processing step employs the pixel processing method of line averaging as one of the pixel processing methods.

5. The method of claim 1 wherein said processing step employs the pixel processing method of line doubling as one of the pixel processing methods.

6. The method of claim 1 wherein a first feature magnitude signal measures motion, a second feature magnitude signal measures image edges and further comprising the step of:

combining the output pixel data with the fields of input video pixel data to produce frames of video pixel data.

7. The method of claim 1 and further comprising the step of combining the output pixel data with the fields of input video pixel data to produce frames of video pixel data.

8. The method of claim 1 wherein said step of generating one or more feature magnitude signals is performed by measuring motion.

9. The method of claim 1 wherein said processing step employs the pixel processing method of line averaging as one of the pixel processing methods.

10. The method of claim 1 wherein said processing step employs the pixel processing method of line doubling as one of the pixel processing methods.

11. The method of claim 1 wherein a first feature magnitude signal measures motion, a second feature magnitude signal measures image edges and further comprising the step of:

combining the output pixel data with the fields of input video pixel data to produce frames of video pixel data.

12. A pixel generator for providing pixel data to create frames of video pixel data from fields of input video pixel data, comprising:

a field buffer for storing a plurality of the fields of input video pixel data;

a feature detector in data communication with said field buffer for generating one or more feature magnitude signals based on said input video pixel data;

a pixel processor in data communication with said field buffer circuit and comprising at least two different logic circuits for generating at least two different intermediate pixel data values based on said input video pixel data;

a feature analyzer in data communication with said feature detector for selecting a feature weight corresponding to each intermediate pixel data value, wherein the selection is based upon the value of said one or more feature magnitude signals; and a pixel averager in data communication with said feature analyzer and pixel processor for calculating output pixel data based upon a weighted average of the intermediate pixel data values.

13. The pixel generator of claim 12 and further comprising a frame buffer in data communication with said pixel averager and for combining said output pixel data with the fields of input video pixel data to produce frames of video pixel data.

14. The pixel generator of claim 12 wherein said feature detector produces a feature magnitude signal that measures motion.

15. The pixel generator of claim 12 wherein said feature detector produces a feature magnitude signal that measures acceleration.

16. The pixel generator of claim 12 wherein said feature detector produces a feature magnitude signal that measures image edges.

17. The pixel generator of claim 12 wherein one of said logic circuits processes the input video pixel data using line averaging.

18. The pixel generator of claim 12 wherein one of said logic circuits processes the input video pixel data using line doubling.

19. The pixel generator of claim 12 wherein said feature detector circuit produces a feature magnitude signal that measures motion and further comprising a frame buffer coupled to said pixel averager and operable to combine the output pixel data with the fields of input video pixel data to produce frames of video pixel data.

20. A digital television system comprising:

a field buffer for storing a plurality of the fields of input video pixel data;

a feature detector in data communication with said field buffer for generating one or more feature magnitude signals based on said input video pixel data;

a pixel processor in data communication with said field buffer circuit and comprising at least two different logic circuits for generating at least two different intermediate pixel data values based on said input video pixel data;

a feature analyzer in data communication with said feature detector for selecting a feature weight corresponding to each intermediate pixel data value, wherein the selection is based upon the value of said one or more feature magnitude signals; and a pixel averager in data communication with said feature analyzer and pixel processor for calculating output pixel data based upon a weighted average of the intermediate pixel data values.

21. The digital television system of claim 20 wherein said display comprises a spatial light modulator.

22. The digital television system of claim 20 wherein said feature detector circuit produces a feature magnitude signal that measures motion.

23. The digital television system of claim 20 wherein said display comprises a spatial light modulator and wherein said feature detector circuit produces a feature magnitude signal that measures motion.

24. A method of generating pixel data for creating frames of video pixel data from fields of input video pixel data, comprising the steps of:

storing a plurality of the fields of input video pixel data;

generating one or more feature magnitude signals from on or more of the field of input video pixel data, wherein one of said one or more feature magnitude signals measures image edges;

processing the input video pixel data with at least two different pixel processing methods to generate at least two different intermediate pixel data values;

selecting a feature weight corresponding to each intermediate pixel data value, wherein the selection is based upon the value of said one or more feature magnitude signals; and generating output pixel data based upon a weighted average of the intermediate pixel data values wherein the weights consist of the feature weights corresponding to each intermediate pixel data value.

\* \* \* \* \*